United States Patent
Dai et al.

(10) Patent No.: US 6,763,142 B2
(45) Date of Patent: Jul. 13, 2004

(54) SYSTEM AND METHOD FOR CORRELATED NOISE REMOVAL IN COMPLEX IMAGING SYSTEMS

(75) Inventors: X. Long Dai, Round Rock, TX (US); Martin A. Hunt, Austin, TX (US)

(73) Assignee: nLine Corporation, Austin, TX (US)

( * ) Notice: Subject to any disclaimer, the term of this patent is extended or adjusted under 35 U.S.C. 154(b) by 361 days.

(21) Appl. No.: 09/949,266

(22) Filed: Sep. 7, 2001

(65) Prior Publication Data

US 2003/0048957 A1 Mar. 13, 2003

(51) Int. Cl.[7] .............................. G06K 9/40; G06K 9/00
(52) U.S. Cl. .................................... 382/260; 382/145
(58) Field of Search ................................ 382/260–265, 382/100, 181, 190, 210, 218, 219, 141, 142–152, 154, 257, 278, 280, 287, 291, 321; 250/225, 306, 341.4, 492.3, 559.45; 324/770; 356/237.1, 237.5, 401, 521

(56) References Cited

U.S. PATENT DOCUMENTS

| | | | |
|---|---|---|---|
| 3,697,149 A | | 10/1972 | Van Heeckeren et al. ... 350/3.5 |
| 4,347,001 A | * | 8/1982 | Levy et al. .................. 356/398 |
| 4,720,843 A | | 1/1988 | Haaker et al. ................ 378/99 |
| 4,768,881 A | | 9/1988 | Juptner et al. .............. 356/347 |
| 4,905,706 A | * | 3/1990 | Duff et al. ................... 600/514 |
| 5,112,129 A | | 5/1992 | Davidson et al. ........... 356/359 |
| 5,295,200 A | | 3/1994 | Boyer .......................... 382/43 |
| 5,415,045 A | * | 5/1995 | Wadaka et al. ............... 73/602 |
| 5,448,053 A | * | 9/1995 | Rhoads ..................... 250/201.9 |
| 5,479,257 A | | 12/1995 | Hashimoto ................... 356/347 |
| 5,537,669 A | * | 7/1996 | Evans et al. ................. 382/141 |
| 5,553,157 A | | 9/1996 | Bourguignon et al. ...... 382/131 |
| 5,557,097 A | * | 9/1996 | Ortyn et al. ............. 250/201.3 |
| 5,568,563 A | | 10/1996 | Tanaka et al. .............. 382/144 |
| 5,774,379 A | * | 6/1998 | Gross et al. .................. 702/72 |
| 5,923,278 A | * | 7/1999 | Poehler et al. ................ 342/25 |
| 6,233,549 B1 | * | 5/2001 | Mauro et al. ................ 704/207 |

FOREIGN PATENT DOCUMENTS

EP     0 659 021 A2     6/1995     ............ H04N/7/26

OTHER PUBLICATIONS

PCT Written Opinion for International Application No. PCT/US02/28329. 6 pages, Mailed Nov. 20, 2003.
G. Rizzo et al., "Multimodality Biomedical Image Integration: Use of a Cross–Correlation Technique," Annual International Conference of the IEEE Engineering in Medicine and Biology Society XP000346248. vol. 13 No. 1 PP 219–220, Publication Oct. 31, 1991.
B. Srinivasa Reddy et al., "An FFT–Based Technique for Translation, Rotation, and Scale–Invariant Image Registration," IEEE Transactions on Image Processing XP000595725. vol. 5 No. 8, Aug. 1996.
Q.X. Wu et al., "Translational Motion Compensation for Coronary Angiogram Sequences," IEEE Transactions on Medical Imaging XP 000053819. vol. 8 No. 3, Sep. 1989.
International Search Report PCT/US 02/28329, Mailing Feb. 26, 2003.

* cited by examiner

Primary Examiner—Jayanti K. Patel
(74) Attorney, Agent, or Firm—Baker Botts L.L.P.

(57) ABSTRACT

In the present disclosure a system and method are described for removing fixed pattern noise. The system includes a positioning system for holding and positioning a target, an optical system for capturing images or the target, and a fixed pattern noise removal engine for identifying and removing fixed pattern noise. The fixed pattern noise removal engine preferably identifies fixed pattern noise by analyzing a reference image and target image.

18 Claims, 1 Drawing Sheet

SYSTEM AND METHOD FOR CORRELATED NOISE REMOVAL IN COMPLEX IMAGING SYSTEMS

TECHNICAL FIELD

The present invention relates in general to imaging systems and more particularly to filtering or noise removal methods for use with imaging systems.

BACKGROUND

Imaging systems are used in a variety of applications including the inspection of semiconductor wafers. Such imaging systems may be used to optically scan or capture images of the surface of a target such as a semiconductor wafer to measure the topography of a target surface. This topography may then be analyzed to identify manufacturing or material defects existing on the target. Such analysis is critical in diagnosing manufacturing problems to maintain a desired manufacturing throughput.

One problem that hampers the effectiveness of imaging systems is noise. Noise typically includes unwanted electrical or optical signals that distort and degrade the quality of the data collected by an imaging or inspection system. Noise may occur randomly as various external events may interfere with an imaging system. Noise may also recur regularly as some external events regularly effect an imaging system in the same manner, producing the same pattern of noise. This recurring noise may also be referred to as fixed pattern noise.

There are a several major sources of noise that effect imaging systems. These include camera and sensor noise, nonlinear response noise, optically created noise, photo statistical noise, misregistration noise, and optical aberration noise. Fixed pattern noise may result from a one or more of these types of noise. Other sources of noise may also contribute to fixed pattern noise. Characteristics of fixed pattern noise may include a similar pattern in all image data, a spatially fixed location of the noise, and a time varying complex phasor representing both the magnitude and phase of the noise.

Because noise represents an erroneous signal, noise significantly reduces the effectiveness of imaging and inspection systems. Accordingly noise can severely hamper the ability to identify and remedy manufacturing and material defects, negatively effecting manufacturing throughput and yield.

SUMMARY

Therefore a need has arisen for a system and method for reducing fixed pattern noise in imaging systems.

A further need has arisen for a system and method for increasing the effectiveness of imaging systems used to identify defects in semiconductor manufacturing and materials.

In accordance with teachings of the present disclosure, a system and method are described for removing fixed pattern noise. The system includes a positioning system the can hold and position a target, such as a semiconductor wafer. An optical system is positioned proximate the target to capture images thereof and is also linked to a fixed pattern noise removal engine. The fixed pattern noise removal engine receives complete object wave data of both a reference image and a target image captured by the optical system. The fixed pattern noise removal engine utilizes a filter for fixed pattern noise removal by dividing the cross power spectral density of the reference image and the target image by the power spectral density of the reference image.

More particularly, the fixed pattern noise removal engine may identify fixed pattern noise by applying the filter to the reference image. Further, the fixed pattern noise removal engine may also remove the identified fixed pattern noise from the target image by subtraction on a pixel-by-pixel basis.

More particularly, the fixed pattern noise removal engine generates a Fast Fourier Transform (FFT) and a complex conjugate of the FFT of the reference image. The fixed pattern noise removal engine then generates the power spectral density of the reference image. The fixed pattern noise removal engine also generates a Fast Fourier Transform (FFT) and a complex conjugate of the FFT of the target image. The fixed pattern noise removal engine then generates the power spectral density of the target image. Finally, the fixed pattern noise removal engine calculates the cross power spectral density utilizing the power spectral density of the target image and the power spectral density of the reference image.

The present disclosure includes a number of important technical advantages. One important technical advantage is identifying the fixed pattern noise within the reference image and the target image by dividing the cross power spectral density of the reference image and the target image by the power spectral density of the reference image. This allows the system to identify fixed pattern noise and therefore removing fixed pattern noise. This method also acts to increase the effectiveness and sensitivity of imaging systems used to identify defects in semiconductor manufacturing and materials.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
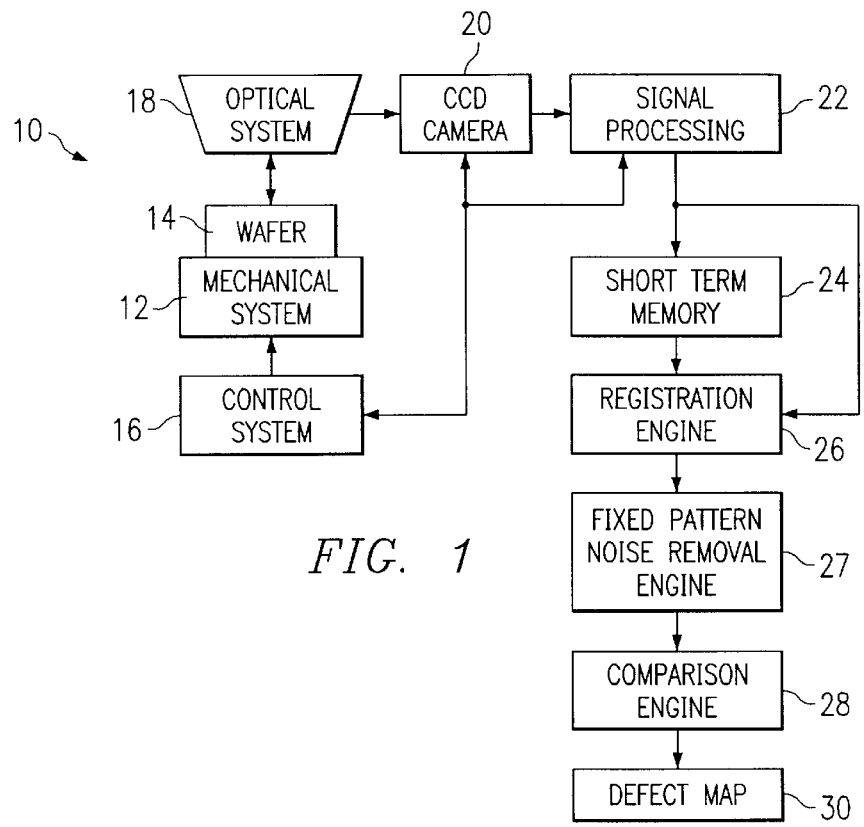
FIG. 1 is a schematic diagram showing an imaging system according to the present invention.
Figure 2:
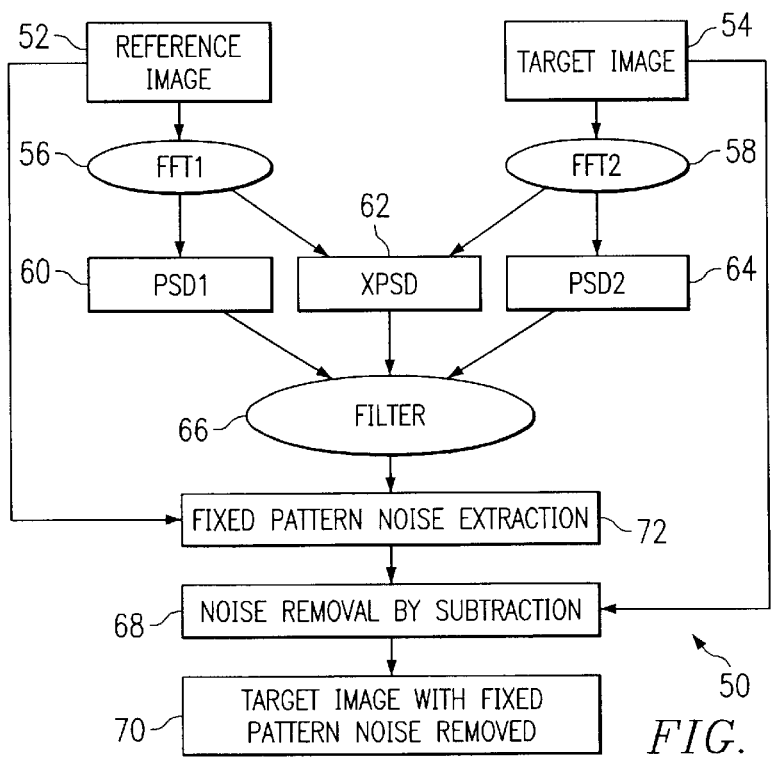
FIG. 2 is a flow diagram showing a fixed pattern noise removal method according to the present invention.

Preferred embodiments and their advantages are best understood by reference to FIGS. 1 and 2 wherein like numbers are used to indicate like and corresponding parts.

Now referring to FIG. 1, an imaging system depicted generally at 10 according to the present invention is shown. Imaging system 10 includes mechanical system 12 operable to hold and position target 14. Target 14 may include a semiconductor wafer or another target suitable for inspection. Mechanical system 12 is preferably operable to selectively hold target 14 and is also operable to selectively position or 'step' target 14. In a preferred embodiment, mechanical system 12 is operable to selectively step target 14 in sequential steps sized according to the field view (FOV) of optical system 18. Optical system 18 is positioned proximate mechanical system 12 and target 14 such that optical system 18 may effectively capture images of target 14. Images captured by optical system 18 exit optical system 18 as spatial domain data 19. In a preferred embodiment, the image data captured by optical system include a measurement of height (z) and reflectance (a) for each position (x,y) of target 14. Accordingly, in this preferred embodiment, four dimensional data is captured by optical system 18.

Mechanical system 12 is preferably operated by control system 14. Control system 14 is also preferably linked to CCD Camera 20 and signal processing system 22 and is operable to submit image location data thereto. Such image location data may be included with the captured image data to discern which images correlate to one another.

In the present embodiment, charged coupled device (CCD) camera 20 is further operably connected to optical system 18. In an alternative embodiment, any suitable device may be utilized to receive and store spatial domain data 19 from optical system 18. Optical system 18 and CCD camera 20 may preferably utilize direct to digital holography (DDH) techniques as shown in U.S. Pat. No. 6,078,392 issued to Clarence E. Thomas, et al. and incorporated herein by reference. Alternatively, optical system 18 and camera 20 may utilize any suitable technique to capture height (Z) and reflectance (A) data for points X,Y on target 14. In the present disclosure, reference to complex image data preferably includes image data that is derived from X,Y,Z and A obtained for portions of a given target. Complex data may preferably include X,Y,Z and A image data that has been transformed from the spatial domain into the frequency domain. In one particular embodiment, this transform may be accomplished using Fast Fourier Transform (FFT) techniques. X,Y,Z and A image date that has been transformed into frequency domain data, is referred to herein as frequency data or complex frequency data.

Light from optical system 18 may preferably be directed to CCD camera 20. CCD camera is operable to record holographic image data without the use of a photographic plates or film. Further, CCD camera 20 is preferably operable to digitally record the holographic image data captured by imaging system 10.

Signal processing system 22 is operably coupled to CCD camera 20. Signal processing system 22 is further operable to receive and process digital holographic images from CCD camera 20. Processing by signal processing system 22 preferably includes transforming data recorded by camera 20 into frequency domain data. Preferably, this processing includes a Fourier transform of holographic data, locating the signal carrier frequency of the holographic data, and extracting the frequency of the complex object wave of the holographic data. The information extracted by signal processing system 22 may be generally referred to as frequency data and may include any frequency data obtained by transforming the spatial domain data received, into frequency domain data. In a particular embodiment, signal processing system 22 is operable to output Fast Fourier Transform (FFT) data in a streaming fashion with every instance representing the FFT of one field of view. Data processed by the signal processing system 22 may be sent to short term memory 24 and later sent to registration engine 26 when its corresponding field of view becomes available. Short term memory 24 may include any short term memory suitable for storing frequency data received from signal processing system 22. Short term memory 24 is further operatively connected to registration engine 26. When a new FOV comes out of signal processing 22, short term memory 24 is searched to find the frequency image of its corresponding FOV, previously captured. The frequency data of the image pair is then sent to registration engine 26. The new FOV data is then stored in short term memory 24 to wait for it corresponding FOV from the next die or corresponding target portion. The 'old' FOV data is removed from short term memory 24.

Registration engine 26 is operatively connected to signal processing system 22 as well as short term memory 24. Registration engine 26 is preferably operable to receive complex image data from signal processing system 22 and complex image data from signal processing system 22. Registration engine 26 is operable to identify the translation or 'shift' between the corresponding images. Translation identified by registration engine 26 may be shifts required in both the X and Y directions for one image to align with its corresponding image.

Registration image 26 is preferably coupled to fixed pattern noise removal system 27. Fixed pattern noise removal system 27 is preferably operable to identify and remove fixed pattern noise contained in the images received. Fixed pattern noise removal system preferably identifies fixed pattern noise existing in both a reference image and a target image as described in FIG. 2 below.

After fixed pattern noise has been identified and removed by fixed pattern noise removal engine 27, the images may be sent to comparison engine 20. Comparison engine 28 is operable to compare corresponding images.

Comparison engine 28 is operatively coupled to defect mapping engine 30. Defect mapping engine 30 preferably identifies defects, differences, or irregularities between pairs of corresponding images received from comparison engine 28 and registration engine 26.

In operation for identifying fixed pattern noise, mechanical system 12 preferably positions target 14 such that a preferred portion of a target is positioned in the field of view of optical system 18 to obtain either a reference image or a target image. A reference image may be obtained from a flat field, a smooth surface, or another suitable portion of the target. The target image may be obtained by positioning the field of view of optical system 18 on a selected portion of the target such as a portion of a semiconductor die. The image obtained by optical system 18 may include holographic image data from which the complete object wave image data may be extracted, including phase and magnitude image data.

Image data captured by optical system 18 may then preferably be sent to CCD camera 20, as described in FIG. 1. After the image of die section is captured by optical system 18, mechanical system 12 may then move or 'step' the wafer such that a different die section is positioned in the field of view of the optical system 18. Accordingly, each 'step' of mechanical system 12 is preferably sized according to the field of view of optical system 18. In a preferred embodiment, the movement of mechanical system 12 follows a preselected pattern to ensure that all areas of interest on target 12 are properly imaged. In an alternative embodiment, a mechanical system may position an optical system with respect to a fixed target. In another alternative embodiment, mechanical system 12 may continuously move target 14 through the field of view of optical system 18 and optical system 12 capture images at selected time intervals to ensure that the areas of interest of target 12 are properly imaged.

Image data is sent from optical system 18 to CCD camera 20 and then to signal processing system 22. The processed image data sent on to be registered may be in any suitable format such as: the raw frequency domain signal after carrier frequency is extracted, the complex spatial domain data, the magnitude image data, and the phase data. This capability of being able to process image data in a variety of formats may alleviate data processing or pre-processing requirements. Preferably, the image data sent from signal processing system 22 is frequency domain data. Alternatively, data suitable for registration may be obtained from any point along the data stream in which suitable complex image data may be obtained.

The processed image data may then be both held in short term memory 24 and sent directly to registration engine 26. Registration engine 26 identifies which images are associated with corresponding die portions by identifying the position of an image in a wafer coordinate system. In a preferred embodiment this may be accomplished by identifying the die number and the frame coordinates within the die for each image, as determined by control system 16, as shown in FIG. 1.

Referring now to FIG. 2, a flow diagram showing a fixed pattern noise removal method, indicated generally at 50, according to the present invention is shown. Fixed pattern noise removal method takes place within a noise removal engine such as fixed pattern noise removal engine 27, as shown in FIG. 1. Fixed pattern noise removal method 50 begins with receiving reference image 52 and receiving a target image 54. Reference image 52 may be an image from a flat field, a smooth surface, or another suitable reference surface. Target image 54 may be an image of a target or a portion of a target, such as a portion of a die on a semiconductor wafer. In a preferred embodiment, target image 54 and reference image 52 are captured using an optical system employing direct to digital holography techniques. Preferably, reference image 52 and target image 54 include complete object wave image data. In a much preferred embodiment, reference image 52 and target image 54 include phase image data.

Next a Fast Fourier Transform (FFT) of reference image 52 is generated (FFT1) 56. Also, a FFT of target image 54 is generated (FFT2) 58. FFT of the reference image (FFT1) 56 is then used to calculate the power spectral density (PSD) of the reference image (PSD1) and the FFT of the target image (FFT2) 54 is then used to calculate the PSD of the target image (PSD2) 64. The FFT of both the reference images 56 and the target images 58 are preferably used to generate a cross power spectral density (XPSD) 62 of reference image 52 and target image 54.

The frequency response of noise extraction filter 66 may then preferably be identified as XPSD 62 divided by PSD1 52. Fixed pattern noise extraction filter 66 may then be preferably applied 72 to reference image 52. The fixed pattern noise identified 72 may then be subtracted from the target image 68. Preferably, a subtraction type technique may be employed. Following noise extraction step 68, which may also be referred to as a filtering step, a resulting filtered reference image results with the identified fixed pattern noise removed. The filtered image obtained in step 68 may then be sent to a comparison engine 28 as shown in FIG. 1. Additionally, noise removal step 68 may then be repeated for a plurality of images obtained by optical system 18, as shown in FIG. 1 by utilizing identified fixed pattern noise 72.

Although the disclosed embodiments have been described in detail, it should be understood that various changes, substitutions and alterations can be made to the embodiments without departing from their spirit and scope.

What is claimed is:

1. An imaging system comprising:
   a positioning system operable to position a target;
   an optical system disposed proximate the positioning system;
   a fixed pattern noise removal engine operatively coupled to the optical system and operable to:
   receive complete object wave data of a reference image and a target image, wherein the complete object wave data comprises a phase image and magnitude image of the reference and a phase image and a magnitude image of the target; and
   define a fixed pattern noise filter by dividing the cross power spectral density of the reference image and the target image by the power spectral density of the reference image.

2. The imaging system of claim 1 wherein:
   the reference image comprises image data from a flat field; and
   the target image comprises image data from a target surface.

3. The imaging system of claim 1 wherein:
   the reference image comprises image data from a smooth surface; and
   the target image comprises image data from a target surface.

4. The imaging system of claim 1 further comprising the fixed pattern noise removal engine further operable to:
   identify fixed pattern noise by applying the fixed pattern noise filter to the reference image; and
   subtract the identified fixed pattern noise from the target image.

5. The imaging system of claim 4 further comprising the fixed pattern noise removal engine operable to subtract the identified fixed pattern noise on a pixel by pixel basis.

6. The imaging system of claim 1 further comprising the fixed pattern noise removal engine operable to remove the identified fixed pattern noise from a plurality of received images.

7. The imaging system of claim 1 wherein the fixed pattern noise removal engine further operable to:
   generate a FFT of the reference image;
   generate a complex conjugate of the FFT of the reference image;
   generate a power spectral density of the reference image utilizing the FFT of the reference image and the complex conjugate FFT of the reference image;
   generate a FFT of the target image;
   generate a complex conjugate of the FFT of the target image;
   generate a power spectral density of the target image utilizing the FFT of the target image and the complex conjugate FFT of the target image; and
   generate a cross power spectral density utilizing the power spectral density of the target image and the power spectral density of the reference image.

8. The imaging system of claim 1 further comprising:
   a CCD camera operatively coupled to the optical system;
   a signal processor operatively coupled to receive image data from the CCD camera and operatively coupled to send image data to the fixed pattern noise removal system.

9. The imaging system of claim 8 further comprising:
   a registration engine operatively coupled to the signal processor and operatively coupled to the fixed pattern noise removal system, the registration engine operable to submit registered images to the fixed pattern noise removal system; and
   a correlation engine operatively coupled to the fixed pattern noise removal system and operable to receive image data therefrom.

10. A fixed pattern noise removal system of claim 1, the fixed pattern noise removal engine further operable to remove the identified fixed pattern noise from a plurality of received images.

11. A fixed pattern noise removal system of claim 1 wherein the fixed pattern noise removal engine further operable to:
generate a FFT of the reference image;
generate a complex conjugate of the FFT of the reference image;
generate a power spectral density of the reference image utilizing the FFT of the reference image and the complex conjugate FFT of the reference image;
generate a FFT of the target image;
generate a complex conjugate of the FFT of the target image;
generate a power spectral density of the target image utilizing the FFT of the target image and the complex conjugate FFT of the target image; and
generate a cross power spectral density utilizing the power spectral density of the target image and the power spectral density of the reference image.

12. A fixed pattern noise removal system comprising:
a fixed pattern noise removal engine operable to:
receive complete object wave data for a target image and a reference image, wherein the complete object wave data further comprises a phase image and magnitude image of the reference image and a phase image and magnitude image of the target image;
define a fixed pattern noise filter by dividing the cross power spectral density of the reference image and the target image by the power spectral density of the reference image;
identify fixed pattern noise by applying the fixed pattern noise filter to the reference image; and
remove the identified fixed pattern noise from the target image.

13. A fixed pattern noise removal system of claim 12 wherein:
the reference image comprises image data from a smooth surface; and
the target image comprises image data from a target surface.

14. A fixed pattern noise removal system of claim 12 further comprising the reference image and target image captured by a CCD camera.

15. The fixed pattern noise removal engine of claim 12 the fixed pattern noise removal engine operable to receive digital holographic images of a reference image and a target image obtained by a CCD camera.

16. A method of removing fixed pattern noise comprising:
receiving complex image data of a reference image including a phase image and magnitude image;
receiving complex image data of a target image including a phase image and a magnitude image;
defining a fixed pattern noise filter by dividing the cross power spectral density of the reference image and thee target image by the power spectral density of the reference image;
identifying fixed pattern noise by the fixed pattern noise filter to the reference image; and
removing the identified fixed pattern noise from the target image.

17. The method of claim 16 further comprising:
generating a FFT of the reference image;
generating a complex conjugate of the FFT of the reference image;
generating a power spectral density of the reference image utilizing the FFT of the reference image and the complex conjugate FFT of the reference image;
generating a FFT of the target image;
generating a complex conjugate of the FFT of the target image;
generating a power spectral density of the target image utilizing the FFT of the target image and the complex conjugate FFT of the target image; and
generating a cross power spectral density utilizing the power spectral density of the target image and the power spectral density of the reference image.

18. The method of claim 16 further comprising:
receiving frequency data of the reference image; and
receiving frequency data of the target image.

* * * * *